July 7, 1931.  W. L. MOORE  1,813,675
PHOTOGRAPHIC ABRASIVE PENCIL
Filed Nov. 2, 1929
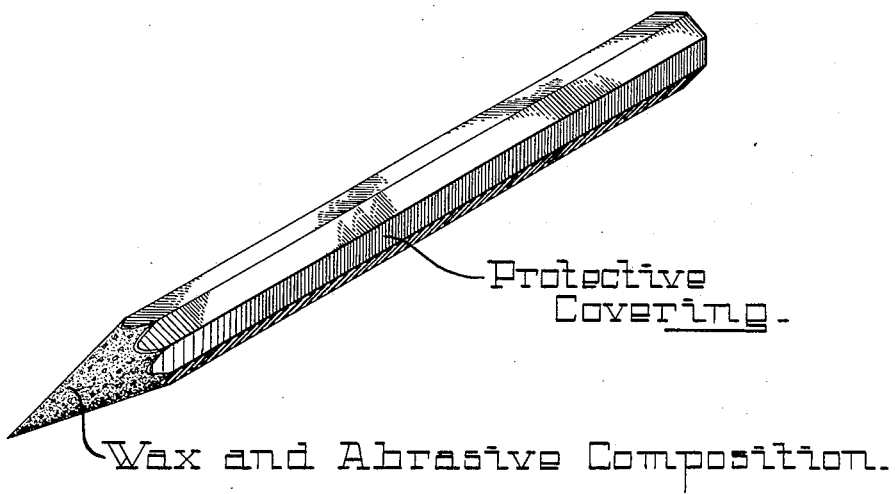
Inventor
William L. Moore Patented July 7, 1931

1,813,675

UNITED STATES PATENT OFFICE

WILLIAM L. MOORE, OF DAYTON, OHIO

PHOTOGRAPHIC ABRASIVE PENCIL

Application filed November 2, 1929. Serial No. 404,356.

This invention relates to a new composition of matter particularly adapted for use as an abrasive pencil for photographic and lithographic purposes.

In the photo-lithographic art, color-separation half-tone negatives when made high enough for offset plates almost always require an opening up in some areas. The process worker, in opening up these areas, has had to resort to Ben Day tints laying on the metal plates to make such needed corrections. Methods for strengthening the image other than by laying of Ben Day tints have been sought in this art, but until the advent of my invention, no satisfactory substitutes have been found. In the photographic industry a similar need has been felt, particularly for use in portrait work. While the etching knife, together with the abrasive paste and chemical reducer are extensively used in this field, they represent extreme retouching media and for that reason some good intermediate reducing medium between the scope of these has been needed.

An object of the present invention is to provide a new composition of matter particularly suited for supplying the above needs. Another object of my invention is to provide for both the photo-lithographer and the photographer an effective and easily used retouching medium. Other objects will hereinafter appear.

I have found that an abrasive material compounded primarily from a mineral wax of sufficient hardness and high melting point, a second wax preferably of animal or vegetable origin which renders the first wax somewhat more pliable and does not appreciably lower its melting point and a fine abrasive may be so combined as to make an excellent abrasive for photographic and allied uses. These ingredients may be compounded with the aid of heat and after thorough mixing formed into any desired shape for the particular use to which they are to be applied.

The mineral waxes which I have found most suitable for my purpose are cerasin and ozokarite and similar mineral waxes having little or no saponifiable material. Many mineral waxes may be employed in my composition and particularly mineral waxes containing a small percentage of oil, but I have found that cerasin and particularly the grade of cerasin called Utah wax has proved very advantageous. The animal wax which we have used to advantage has been primarily bees wax, but waxes like spermaceti having similar physical constances such as melting point and consistency may be employed,— waxes having a saponification value much above 125, however, are not particularly advantageous. As an abrasive pumice, santorinei, or for purposes in which very slight degrees of abrasion are required, infusorial earth may be used to good advantage.

I shall now give a preferred formula of my new composition of matter, but it will be understood that I will not be limited by the ingredients or proportions therein given except as they are indicated in the appended claims.

| | Parts |
|---|---|
| Cerasin | 40 |
| Pure bees wax | 10 |
| Finely screened pumice powder | 50 |

While the above proportions are preferred, it is not essential that they be strictly adhered to. For instance, the cerasin may vary from say 35 to 45 parts, while the bees wax may vary from 5 to 15 parts and the pumice from approximately 40 to 60 parts without appreciably departing from the good results which I obtained by this composition.

I have found that the preferred proportions gives an abrasive, when used to reduce the image on a photographic negative or similar surface, that cuts well and the removed silver and abrasive rubbish is in such a form that it can be readily brushed from the surface without smudging. If a larger proportion of animal wax be added than the amounts limited by the above percentages the abrasive will not cut well, while if the proportion of mineral wax be reduced appreciably the débris smudges the negative and cannot be clearly removed.

Abrasive or reducing pencils or similar products may be made from this composition either by melting the composition and pouring into suitable molds, or by the extrusion of the material through a forming die and cutting the extruded pencil or shape into required lengths. With an abrasive pencil prepared from my composition, shadows in photographic negatives can be readily and quickly strengthened, backgrounds put in, modeling improved and objectionable highlights softened or remodeled.

The accompanying drawing is a diagrammatic view of one type of abrasive pencil that is especially useful for the retouching of photographic and lithographic reduced silver transparencies. As clearly indicated in the drawing the core consists of my abrasive composition comprising a homogenous mixture of the mineral, and vegetable waxes with the abrasive indicated by the caption "wax and abrasive composition" while the outer surface of the pencil is coated with a "protective covering" such as a colored lacquer, a high melting bituminous material, or an equally protective coating.

It will be understood that various changes may be made in the type of mineral wax and animal wax used, providing they conform with the physical characteristics of my preferred wax, as well as in the various types of abrasive compounds employed as well as in the proportions used, without in any way departing from my invention or sacrificing any of the advantages that may be derived therefrom.

What I claim as my invention and desire to be secured by Letters Patent of the United States is:

1. An abrasive pencil for photographic and allied arts comprising a mineral wax containing approximately no saponifiable material, a wax having a saponification number of less than 125, and an abrasive material.

2. An abrasive pencil for photographic and allied arts comprising cerasin wax, bees wax and powdered pumice.

3. An abrasive pencil for photographic and allied arts comprising approximately 40 parts of cerasin, 10 parts bees wax and 50 parts of powdered pumice.

Signed at Dayton, Ohio, this 24th day of October, 1929.

WILLIAM L. MOORE.